Nov. 13, 1956   L. N. ALLEN, JR   2,770,295
CONCENTRATING PROCESS AND APPARATUS
Filed Dec. 5, 1952
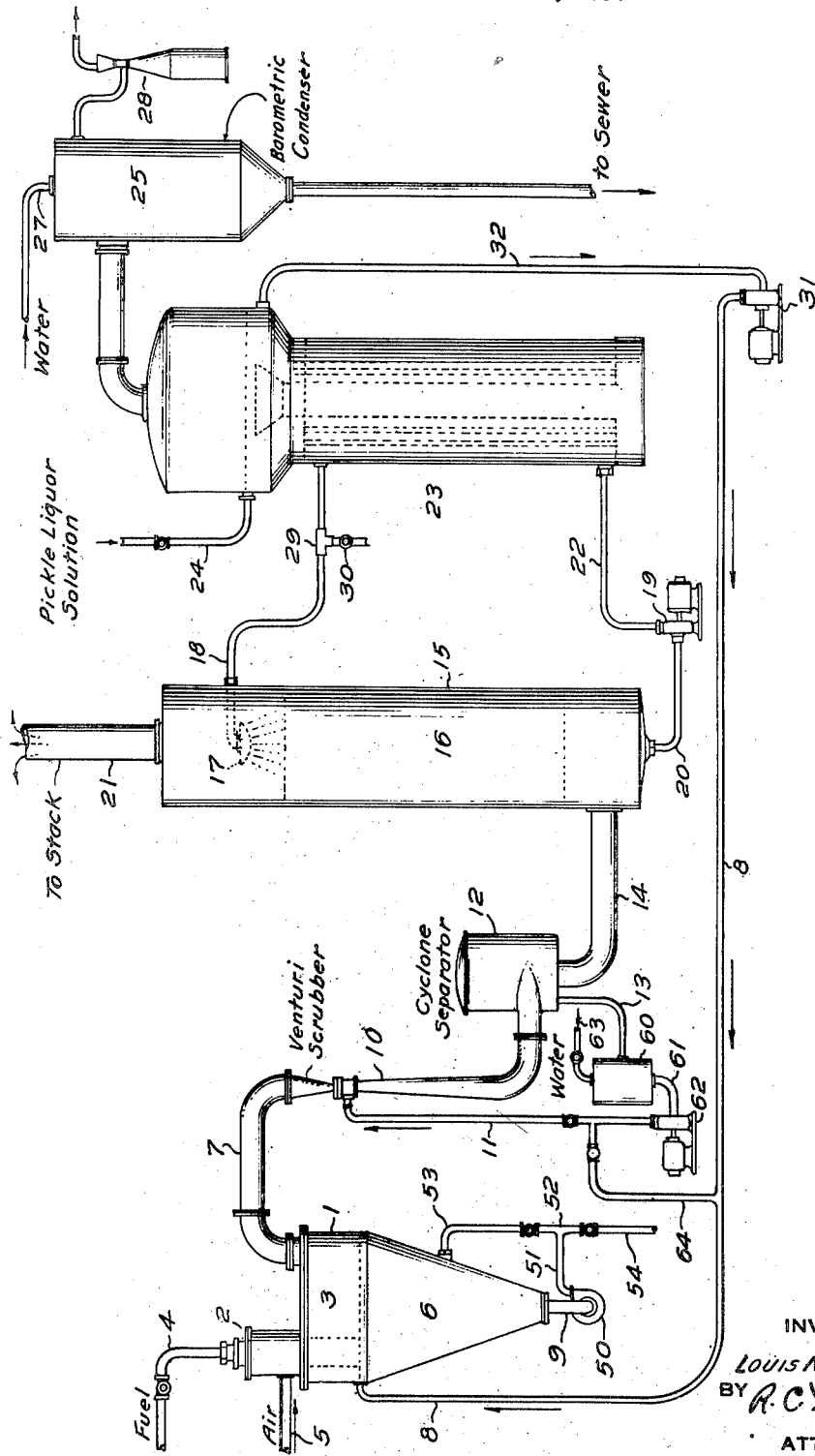
INVENTOR
LOUIS N. ALLEN, JR.,
BY R. C. MacNab
ATTORNEY

United States Patent Office 2,770,295
Patented Nov. 13, 1956

2,770,295

CONCENTRATING PROCESS AND APPARATUS

Louis N. Allen, Jr., Short Hills, N. J.

Application December 5, 1952, Serial No. 324,257

7 Claims. (Cl. 159—16)

This invention relates to processes and apparatus for evaporation and concentration of liquids and more particularly to such processes and apparatus wherein hot gas is blown through a solution to heat the same and evaporate water therefrom. The invention is particularly useful for the evaporation of pickle liquor to produce a filter cake of ferrous sulfate and a solution of sulfuric acid of increased concentration, but it is understood that the process and apparatus of the present invention may be used to effect the concentration of other liquids or solutions amenable to evaporation by blowing with hot gas.

Hot gas blown evaporators are well known in the art and find especial usefulness in various fields of industry. The source of the gas is not particularly important and waste hot stack gases, if readily available, may be used. In other cases the hot gas is generated by means of a separate, specially designed burner arranged to discharge its products of combustion directly into or beneath the surface of the liquid to be evaporated. These latter burners are known in general as submerged burners, and the process, as submerged combustion. Among the advantages derived from the use of submerged combustion is the ability to evaporate large quantities of water at a rapid rate. This is due to the increased rate of heat transfer at the temperature of the combustion flame. The gaseous effluent from such a process consists in the main of water vapor (steam) and gaseous products of combustion but may under certain conditions contain, in addition, minor amounts of mist (sulfuric acid mist as when pickle liquor is evaporated), or other entrained matter resulting from decomposition or otherwise, as may occur with the evaporation of different aqueous solutions. In any event the temperature and quantity of water vapor evolved, together with the hot gas represents a substantial heat loss to the process.

I have found that the overall efficiency of such a process may be substantially increased by carrying out the evaporation in two steps or stages, the first stage being a preliminary heating and concentration by evaporation under reduced pressure with heat obtained from the effluent hot gases and water vapor from the second or primary evaporation step, and it is a principal object of the present invention to provide such a process together with apparatus for performing it.

A further object of the invention is the provision of a process for recovering heat from such effluent or exhaust gases in a form such that it may be used, advantageously, in the preliminary concentration stage to accomplish evaporation without the use of any additional fuel or steam.

A still further object of the invention is the provision of means for separating sulfuric acid mist or other matter from such gases and water vapor, prior to the recovery of heat therefrom, whereby acid corrosion of subsequent heat exchange equipment is substantially avoided.

The above objects and others are accomplished by the present invention by condensing the water vapor contained in the exhaust gases by means of a water spray consisting of a controlled quantity of water previously condensed from such gases. By this means the latent heat of condensation is recovered as sensible heat of the spray and a total body of liquid condensate, at a temperature not substantially less than the wet bulb temperature of the gases being treated, is obtained. Thus both the latent heat of the water vapor and the water vapor itself is removed from the gas, and the gas containing relatively few remaining heat units may be simply discharged into the atmosphere. The hot liquid condensate is then passed to the preliminary evaporator where it is brought into heat exchange relation with the feed of solution entering the process for the purpose of being concentrated. The preliminary evaporator is of the tubular type, provided with a barometric leg for conducting evaporation of the feed solution under reduced pressure. From the preliminary evaporator the feed solution passes to the primary evaporator where it is blown with hot gas as heretofore described and the hot liquid condensate which has been cooled during heat exchange is recycled, or returned to the spray. Since water vapor is continuously condensed from the effluent gases by the spray it must be substantially continuously removed from the cycle to prevent its accumulation and upsetting of the heat balance or transfer of heat in the process. Thus, it may be seen that the incoming feed solution is subjected to a pre-evaporation or pre-concentration step while in its dilutest form and at its lowest boiling point rise. This enables the greatest heat extraction from the effluent gases, equivalent to the highest temperature possible, to occur at the spray.

In one embodiment of the invention, especially useful when employed to concentrate ferrous sulfate pickle liquor, the effluent gas from the primary evaporator is treated to remove sulfuric acid mist before condensation of the water vapor. This is advantageously acomplished by means of a venturi type gas scrubber employing a small quantity of water, and a cyclonic separator as shown in the patent to Johnstone et al. 2,604,185, but it is understood that other precipitating or removal arrangements may be used without departing from the spirit and scope of the invention.

In order that the invention may be more clearly understood reference is made to the accompanying drawing in which the single figure is a front elevation in diagrammatic form of a preferred apparatus useful for conducting the process of the present invention.

In the drawing, the numeral 1 designates the primary evaporator which consists of a large, closed cylindrical vessel provided with a depending, conically shaped bottom. The top of the evaporator is provided with a burner 2 which has a combustion tube 3 that extends downwardly through the top to a point beneath the level of the liquid in the evaporator as shown in dotted lines. Fuel, consisting of either gas or oil is fed to the burner through pipe 4, and air through pipe 5. The fuel is burned in the combustion tube and the hot products of combustion are discharged directly into the solution at the lower end of the tube and bubble up through the liquid into the vapor space. The evaporator is also provided with a conduit 7 in communication with the vapor space, and with a solution feed pipe 8 and concentrate draw-off pipe 9. Feed pipe 8 is arranged to discharge pre-concentrated solution into the evaporator at a high point therein, while pipe 9 is arranged as shown for drawing off the concentrate which collects in the lower conical portion of the evaporator. Should matter precipitate from the concentrate, as for instance crystals of ferrous sulfate when pickle liquor is being concentrated pipe 9 is best connected to a pump 50 for discharge through pipe 51, T connection 52 and return pipe 53 to the evaporator. The pump maintains constant circulation of the crystal slurry to prevent packing or plugging of the drawoff. Discharge of the slurry from the evaporator is by way of pipe 54 connected to the other side of the T. Both pipes 53 and 54 are provided with valves as shown for controlling recirculation and discharge.

From the conduit 7 the effluent gases pass through a venturi 10, where they are scrubbed with water or dilute acid entering the gas stream at the throat of the venturi through valved pipe 11. This type of scrubber is described more fully in the patent to Johnstone et al. referred to above and is in common use. Its employment in the present relation is particularly advantageous since it operates with the addition of only a small amount of water to the gas stream and serves to efficiently agglomerate sulfuric acid mist or other entrained matter as may be carried over in the gas from the evaporator. The scrubber discharges directly into a cyclone separator 12 of usual construction, where the agglomerated matter is thrown out of the stream and discharged through pipe 13. Pipe 13 connects with a small reservoir 60 and recirculation of aqueous sulfuric acid collecting therein to the venturi is by means of pipe 61, pump 62 and pipe 11. Provision is made for adding water to the acid in the reservoir through valved pipe 63 to control the concentration of the acid and as the acid accumulates it may be constantly withdrawn and returned to the evaporator through valved pipe 64 discharging into pipe 8. Hot gas and water vapor leaving the separator pass by way of conduit 14 into the base of a spray tower 15 where they pass upwardly through suitable loose or porous packing material 16 such as brick checker-work, Raschig rings, etc. In the spray tower the upward rising gas and vapor are met with a countercurrent spray of condensate water discharged from spray head 17 connected to pipe 18 which in turn is connected to a source outside of the tower, later to be described. The quantity and temperature of water discharged at the spray is sufficient to condense the steam or water vapor passing through the tower and ordinarily also cools the gas to a small extent. As a consequence there collects in the bottom, a pool of hot liquid condensate of a temperature not substantially less than the wet bulb temperature of the gases being treated. This is continuously withdrawn by means of pump 19 through pipe 20. Gas, thus separated from water vapor is discharged at the top of the tower to a stack or the like through flue 21.

The hot liquid condensate leaving pump 19 passes by way of pipe 22 into a vertical tube evaporator 23 for indirect heat exchange with liquid solution entering the process whereby this incoming solution is pre-concentrated. The solution is fed into the evaporator by means of a pipe 24 from a suitable source of supply and seeks a level in the evaporator above the heat exchange, tube portion and above the discharge end of the pipe, as shown by the dotted line. The tubular evaporator is advantageously operated under vacuum to obtain evaporation of the feed solution at as low a temperature as possible. For this purpose it is connected to a barometric condenser 25 by means of vapor conduit 26 leading from the top of the evaporator. The condenser is of conventional design, supplied with cool, condensing water by means of pipe 27 and if desired with a jet ejector 28 as shown. Pipe 18, hereinabove referred to, connects with the cooler portion of the vertical tube heat exchange section of the evaporator for conducting the cooled condensate to the spray head 17. Thus it will be seen that the liquid condensate from the spray tower is maintained in continuous cyclic circulation between the tower and the vacuum evaporator or heat exchanger by means of pump 19, and since additional water is being continuously condensed from the effluent gases passing through the tower, water must be withdrawn from the cyclic circulation to prevent excessive accumulation. This is advantageously accomplished by means of the T pipe connection 29 and valve 30 in pipe 18 where the condensate is at its lowest temperature in the cycle. Valve 30 may be automatically opened, periodically, as by the increase in level of the pool of hot condensate in the spray tower or it may be cracked open for continuous discharge of excess condensate to a sewer or the like. Feed solution which has been pre-concentrated in evaporator 23 is continuously withdrawn by means of pump 31 and pipe 32 for discharge into pipe 8 leading to the primary evaporator as described.

While it is believed the method of operation of the apparatus will be thoroughly understood from the above description the following example may serve to better illustrate a practical application of the process.

Consider for instance that it is desired to concentrate a pickle liquor having an approximate composition of 5% $H_2SO_4$, 15% $FeSO_4$ and 80% $H_2O$ to produce 60% $H_2SO_4$ and a filter cake analyzing 65% $FeSO_4$, 5% $H_2SO_4$ and 30% $H_2O$. Fuel is burned intensively in the combustion tube at a temperature of 2400° F. The hot gas passes through the solution in primary evaporator 1, which for the most part is actually a slurry of crystalline $FeSO_4$ in sulfuric acid, and the gas is cooled to about 260° F. evaporating water. The exit gases are then scrubbed in the venturi to agglomerate sulfuric acid mist, the resulting acid removed in the cyclone, and gas and water vapor discharged into the spray tower at a wet bulb temperature of about 175° F. The spray water in the tower is heated by the latent heat of condensation of the water vapor in the gas, and to a small extent by the gas itself, to a temperature approaching 175° F., say 170° F. and the condensate is pumped to the heat exchange section of the vacuum evaporator. Here water is evaporated from the incoming feed under about 4" of mercury, absolute, and the condensate is cooled to a temperature approaching the temperature of the feed solution in the evaporator. The cooled solution, minus a quantity substantially equivalent to the water condensed in the spray tower, is then returned to the spray for further treatment of the hot gas. The concentrate which produces on filtration a filtrate containing approximately 60% $H_2SO_4$ and a filter cake analyzing approximately 65% $FeSO_4$ and 30% $H_2O$ is withdrawn at 54.

The fuel consumption under the above conditions of operation may in some cases be reduced to as much as 60% of that of a hot gas concentrator operating alone, where a combustion, or flame temperature in the evaporator of 2400° F. is maintained.

The process and apparatus of the present invention may be used to concentrate any aqueous solution amenable to concentration by hot blowing with gas provided the boiling point of the solution fed to the vacuum evaporator at the vacuum which can be economically maintained therein is lower than the wet bulb temperature of the gas entering the spray tower.

What I claim is:

1. The process of concentrating a solution which comprises, evaporating solvent therefrom under reduced pressure in a pre-concentrating step and withdrawing the resulting solvent vapor while passing a stream of hotter recirculating liquid in heat exchange with said solution, thereby transferring thereto the heat necessary for the solvent evaporation and cooling the liquid, further concentrating the pre-concentrated solution by physically contacting the solution with hot gas, withdrawing the resulting mixture of gas and hot vapor from the concentrate, physically contacting said mixture of gas and hot vapor with the recirculating cooled liquid to condense the vapor and recover the latent heat of condensation thereof as increased sensible heat in said liquid and returning the resulting liquid to the pre-concentrating step.

2. The process of concentrating an aqueous solution which comprises evaporating water therefrom under reduced pressure in a pre-concentrating step and withdrawing the resulting water vapor while passing a stream of hotter liquid in heat exchange with said solution, thereby transferring thereto the heat necessary for the water evaporation and cooling the liquid, withdrawing a quantity of the cooled liquid and discharging it from the process, further concentrating the pre-concentrated solution by blowing hot gas through the solution in physical contact therewith, withdrawing the resulting mixture of hot gas and vapor from the hot blown concentrate, re-heating the remaining cooled liquid by physically contacting said mixture of gas and hot vapor with the cooled liquid to condense the vapor and recover the latent heat of condensation thereof as sensible heat of the liquid and returning the resulting liquid to the pre-concentrating step, the quantity of cooled liquid discharged from the process being substantially equal to the quantity of liquid resulting from condensation of said vapor.

3. The process of claim 2 wherein entrained matter is removed from the gas and vapor from the hot blown concentrate prior to condensation of the vapor and recovery of the latent heat of condensation.

4. The apparatus of claim 7 wherein a venturi gas scrubber and a cyclone separator are provided in the connection between the hot gas blown evaporator and the spray tower for removing entrained matter from the hot gas and water vapor.

5. The method of continuously concentrating a dilute solution by heat which comprises continuously passing the solution through a first and a second evaporating stage, discharging a stream of hot gas into the solution in the second stage beneath the surface thereof to heat the solution and effect concentration by evaporation of liquid therefrom, withdrawing gas and hot vapor from the solution in the second stage, condensing the vapor to form a body of hot liquid condensate, withdrawing the hot liquid condensate and passing it in heat exchange with the solution in the first evaporating stage while maintaining the solution in said first stage under reduced pressure and thereby causing evaporation and pre-concentration of said solution while simultaneously cooling the withdrawn condensate, discharging a portion of the cooled condensate from the system, passing the remainder of the cooled condensate in intimate physical contact with the gas and hot vapor from the second stage and thereby condensing additional vapor and reheating the cooled condensate, and recycling the resulting reheated and augented condensate through the first evaporating stage.

6. A method according to claim 5 wherein the solution to be concentrated is a ferrous sulfate pickle liquor solution.

7. Apparatus for concentrating aqueous solutions comprising in combination a gas blown evaporator including means for holding a body of solution to be concentrated, means for discharging hot gas therethrough, and a gas outlet for withdrawing the resulting mixture of hot gas and vapors, a heat exchange tower connected to the gas outlet of said evaporator, condensing means including a liquid spray in said tower for condensing the vapor in said gas mixture, a vacuum evaporator provided with a heat exchanger for heating solution therein, means including a pump for delivering hot condensate from the bottom of the spray tower to said heat exchanger and a line for returning cooled condensate therefrom to the spray in said spray tower, means for feeding solution to be evaporated into the vacuum evaporator, a conduit and pump for transferring pre-concentrated solution from said vacuum evaporator to the gas blown evaporator and condensate draw-off means in the cooled condensate line.

References Cited in the file of this patent

UNITED STATES PATENTS

| | | |
|---|---|---|
| 2,016,940 | Hahn | Oct. 8, 1935 |
| 2,355,828 | Taylor | Aug. 15, 1944 |
| 2,611,681 | Bellinger | Sept. 23, 1952 |
| 2,616,790 | Swindin | Nov. 4, 1952 |
| 2,635,555 | Klepetko et al. | Apr. 28, 1953 |

FOREIGN PATENTS

| | | |
|---|---|---|
| 349,567 | Great Britain | May 13, 1931 |
| 303,945 | Italy | Dec. 21, 1932 |